US008606241B2

(12) United States Patent
Park et al.

(10) Patent No.: US 8,606,241 B2
(45) Date of Patent: Dec. 10, 2013

(54) METHOD AND SYSTEM FOR RING BACK TONE ALTERNATIVE SERVICE BASED ON TERMINAL AND MOBILE COMMUNICATION TERMINAL THEREFOR

(75) Inventors: Seongsoo Park, Seoul (KR); Daesic Woo, Seoul (KR); Donghahk Lee, Seongnam-si (KR); Jaehwang Yu, Seoul (KR); Jongtae Ihm, Seongnam-si (KR); Sehyun Oh, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1054 days.

(21) Appl. No.: 12/282,860

(22) PCT Filed: Apr. 16, 2007

(86) PCT No.: PCT/KR2007/001827
§ 371 (c)(1),
(2), (4) Date: Sep. 12, 2008

(87) PCT Pub. No.: WO2007/119990
PCT Pub. Date: Oct. 25, 2007

(65) Prior Publication Data
US 2009/0098891 A1 Apr. 16, 2009

(30) Foreign Application Priority Data
Apr. 14, 2006 (KR) .................. 10-2006-0034161
Apr. 9, 2007 (KR) .................. 10-2007-0034582

(51) Int. Cl.
*H04M 3/42* (2006.01)
*H04W 60/00* (2009.01)
(52) U.S. Cl.
USPC ............ 455/414.1; 455/458; 379/207.16
(58) Field of Classification Search
USPC ............ 455/458, 414.1; 379/207.16
See application file for complete search history.

(56) References Cited

U.S. PATENT DOCUMENTS 6,310,948 B1 * 10/2001 Nemeth ............ 379/213.01
6,574,335 B1   6/2003 Kalmanek et al.
(Continued)

FOREIGN PATENT DOCUMENTS

JP    08-079387    3/1996
JP    10-075308    3/1998
(Continued)

OTHER PUBLICATIONS

International Search Report mailed Aug. 3, 2007 for PCT/KR2007/001827.

*Primary Examiner* — Vladimir Magloire
*Assistant Examiner* — Edd Rianne Plata
(74) *Attorney, Agent, or Firm* — Lowe Hauptman & Ham, LLP

(57) ABSTRACT

Disclosed is a method and a system for providing a terminal-based ringback tone substitute service, as well as a mobile communication terminal for the same. The method includes the steps of (a) receiving a request for an originating call for voice communication with a called terminal from a calling terminal; (b) transmitting a ringback tone start message to the calling terminal, the ringback tone start message being a control message informative of beginning of a ringback tone section; (c) paging the called terminal; (d) transmitting a ringback tone termination message to the calling terminal, the ringback tone termination message being a control message informative of ending of the ringback tone section, and connecting the voice communication between the calling terminal and the called terminal when a response to paging is received from the called terminal; and (e) transmitting the ringback tone termination message to the calling terminal and transmitting unanswered messages to the calling terminal when no response to the paging is received from the called terminal. The mobile communication terminal can play a high-quality ringback tone substitute without being affected by the voice channel environment.

32 Claims, 11 Drawing Sheets

(56) References Cited

U.S. PATENT DOCUMENTS

| | | | |
|---|---|---|---|
| 8,428,239 B2* | 4/2013 | Mutya et al. | 379/207.16 |
| 2002/0034289 A1* | 3/2002 | Pershan | 379/207.02 |
| 2002/0183048 A1* | 12/2002 | Takeuchi | 455/414 |
| 2003/0050837 A1* | 3/2003 | Kim | 705/14 |
| 2004/0120494 A1* | 6/2004 | Jiang et al. | 379/210.01 |
| 2004/0127233 A1* | 7/2004 | Harris et al. | 455/458 |
| 2004/0229594 A1* | 11/2004 | Jung et al. | 455/350 |
| 2005/0172154 A1* | 8/2005 | Short et al. | 713/201 |
| 2006/0093121 A1* | 5/2006 | Sylvain | 379/220.01 |
| 2006/0291634 A1* | 12/2006 | Yeh | 379/142.01 |
| 2006/0291638 A1* | 12/2006 | Radziewicz et al. | 379/211.01 |
| 2007/0280450 A1* | 12/2007 | Wang | 379/142.01 |
| 2007/0286402 A1* | 12/2007 | Jacobson | 379/372 |
| 2008/0108334 A1* | 5/2008 | Wang et al. | 455/414.1 |
| 2008/0130841 A1* | 6/2008 | Pan et al. | 379/87 |
| 2011/0150204 A1* | 6/2011 | Halachmi | 379/207.16 |

FOREIGN PATENT DOCUMENTS

| | | |
|---|---|---|
| JP | 11-068932 | 3/1999 |
| JP | 11-196470 | 7/1999 |
| JP | 2001-320484 | 11/2001 |
| JP | 2002-033801 | 1/2002 |
| JP | 2002-247156 | 8/2002 |
| JP | 2005-108253 | 4/2005 |
| JP | 2005-341125 | 12/2005 |
| KR | 10-2003-0081724 A | 10/2003 |
| KR | 10-2005-0001884 A | 1/2005 |
| KR | 10-2005-0027821 | 3/2005 |
| WO | WO2006-006801 A1 | 1/2006 |

* cited by examiner

METHOD AND SYSTEM FOR RING BACK TONE ALTERNATIVE SERVICE BASED ON TERMINAL AND MOBILE COMMUNICATION TERMINAL THEREFOR

CROSS REFERENCE TO RELATED APPLICATION

This application claims the priority of Korean Patent Application No. 10-2006-0034161, filed on Apr. 14, 2006 and the priority of Korean Patent Application No. 10-2007-0034582, filed on Apr. 9, 2007 in the Korean Intellectual Property Office, the disclosure of which are incorporated herein in their entirety by reference. Further, this application is the National Phase application of International Application No. PCT/KR2007/001827, filed Apr. 16, 2007, which designates the United States and was published in English. This application, in its entirety, is incorporated herein by reference.

TECHNICAL FIELD

The present invention relates to a method and a system for providing a terminal-based ringback tone substitute, as well as a mobile communication terminal for the same. More particularly, the present invention relates to a method and a system for providing a high-quality ringback tone substitute, which is not affected by the wireless channel environment, while minimally modifying the mobile communication network, as well as a mobile communication terminal for the same, wherein the mobile communication network determines whether or not the called terminal responds and whether or not the called number is erroneous, differentiates between the beginning and ending of a ringback tone section, and transmits a control message to the calling terminal, and the mobile communication terminal downloads a ringback tone substitute sound source in advance, stores it, carries both voice and audio codecs, and selectively activates the voice and audio codecs according to the control message received from the mobile communication network so that, in the ringback tone section, the pre-stored ringback tone sound source is decoded by the audio codec and then played and, after the ringback tone section is over, the voice codec is used to provide a voice communication service or a voice message service.

In addition, the present invention relates to a method and a mobile communication terminal for providing a terminal-based ringback tone substitute by employing sound source conversion. More particularly, the present invention relates to a method and a mobile communication terminal for downloading a sound source, storing it, converting the stored sound source so that it can be used as a ringback tone substitute, storing the converted sound source in a memory together with an indication that it is to be played as a ringback tone substitute, and playing the sound source, which is stored in the terminal, as a ringback tone substitute according to a control message received from the mobile communication network.

BACKGROUND ART

As generally known in the art, various wireless communication services are provided via wireless communication networks in line with remarkable development of computers, electronics, and communication technologies. The most basic type of a wireless communication service is a voice communication service, which enables wireless voice communication among mobile communication subscribers using their mobile communication terminals regardless of time and place. A wireless data service has recently appeared and enabled mobile communication subscribers on the move to conduct data communication via wireless communication networks with no spatial restrictions.

Therefore, mobile communication subscribers can not only communicate with desired partners at any place and time based on the voice communication service, but also obtain various pieces of daily information (e.g. news, weather, sports, stocks, exchange rates, and traffic) in various forms (e.g. texts, voices, and images) based on the wireless data service even on the move.

Meanwhile, a ringback tone substitution service has recently been developed and welcomed by mobile communication subscribers. This service replaces conventional ringback tones, which are in many cases simple and mechanical sounds (e.g. ringing sounds) generated during call connection and heard by the calling party, with various types of music (e.g. popular songs), recorded voices of the called or calling party, or other types of sounds (e.g. birds singing, aqua sounds, etc) according to the preference of the called or calling party. As such, the ringback tone substitution service gives the calling party listening pleasure with various sound sources instead of boredom from monotonous and mechanical ringback tones.

FIG. 1 is a flowchart showing a conventional method for providing a ringback tone substitute.

When the calling terminal 110 of the calling party originates a call (S102), the caller-side exchange 120 of the mobile communication network informs the called exchange 130 that an originating call has been requested (S104). The called exchange 130 pages the called terminal 140 (S106), and requests the sound source provision device 150 to provide a ringback tone substitute (S108).

The sound source provision device 150 searches for a sound source, which is to be used as a ringback tone substitute for the called party using the called terminal 140 (S110), and transmits the sound source to the calling terminal 110 via the called and caller-side exchanges 130 and 120 (S112). The calling terminal 110 plays the sound source with its voice codec (S114).

When the called exchange 130 receives a response to paging from the called terminal 140 (S116), it informs the caller-side exchange 120 of the incoming call (S118). The caller-side exchange 120 informs the calling terminal 110 that there is a response to the incoming call (S120). Then, the calling and called terminals 110 and 120 conduct voice communication between them (S124).

In the case of such a conventional ringback tone substitution service, the calling terminal 110 decodes a ringback tone substitute sound source, which has been encoded by a voice codec, by using the voice codec and plays it. Recently, most ringback tone substitute sound sources (e.g. popular songs, supporter's songs) have higher sound quality in line with the development of electronic communication technology. However, encoding and decoding of high-quality sound sources by a voice codec degrade the quality of sounds heard by the calling party.

In an attempt to overcome the problem occurring in the conventional ringback tone substitution service based on a voice codec, it has recently been proposed that the mobile communication network provide the calling terminal 110 with a ringback tone substitute sound source by using an audio codec and that the calling terminal 110, which carries both audio and voice codecs, decode the ringback tone substitute sound source by the audio codec and play it.

Although such a ringback tone substitution service based on an audio codec provides higher sound quality than that of the above-mentioned ringback tone substitution service based on a voice codec due to the fact that the mobile communication network provides the calling party 110 with the ringback tone substitute sound source via a voice channel, limitations on the bandwidth of the voice channel, errors during real-time data communication via the voice channel, etc. inevitably degrade the quality to some extent.

Conventionally, synchronous mobile communication networks employ a voice channel having a transmission rate of about 8 kbps, and asynchronous mobile communication networks employ a voice channel having a transmission rate of about 12.2 kbps. However, voice channels having these transmission rates are insufficient for real-time transmission of recent sound source data having CD-grade sound quality. Furthermore, even in the case of a VoIP (Voice over Internet Protocol) system using a data channel to provide a voice communication service, only a small bandwidth is allocated for a voice data service such as the ringback tone substitution service. In the case of a G.729 codec actually used for the VoIP system, a data transmission rate of 8 kbps or 6.4 kbps is supported. Consequently, conventional ringback tone substitution services cannot provide high-quality ringback tone substitutes, because sound sources to be used as ringback tone substitutes are transmitted from the mobile communication network to the calling terminal 110 via a voice channel to which a small bandwidth is allocated.

DISCLOSURE OF THE INVENTION

Therefore, the present invention has been made in view of the above-mentioned problems, and the present invention provides a method and a system for providing a high-quality ringback tone substitute, which is not affected by the wireless channel environment, while minimally modifying the mobile communication network, as well as a mobile communication terminal for the same, wherein the mobile communication network determines whether or not the called terminal responds and whether or not the called number is erroneous, differentiates between the beginning and ending of a ringback tone section, and transmits a control message to the calling terminal, and the mobile communication terminal downloads a ringback tone substitute sound source in advance, stores it, carries both voice and audio codecs, and selectively activates the voice and audio codecs according to the control message received from the mobile communication network so that, in the ringback tone section, the pre-stored ringback tone sound source is decoded by the audio codec and then played and, after the ringback tone section is over, the voice codec is used to provide a voice communication service or a voice message service.

Furthermore, the present invention provides a method and a mobile communication terminal for downloading a sound source, storing it, converting the stored sound source so that it can be used as a ringback tone substitute, storing the converted sound source in a memory together with an indication that it is to be played as a ringback tone substitute, and playing the sound source, which is stored in the terminal, as a ringback tone substitute according to a control message received from the mobile communication network.

According to an aspect of the present invention, there is provided a method for providing a terminal-based ringback tone substitute service in a system having a caller-side MSC, a receiver-side MSC, an HLR, and a VMS server, the method including the steps of (a) receiving a request for an originating call for voice communication with a called terminal from a calling terminal; (b) transmitting a ringback tone start message to the calling terminal, the ringback tone start message being a control message informative of beginning of a ringback tone section; (c) paging the called terminal; (d) transmitting a ringback tone termination message to the calling terminal, the ringback tone termination message being a control message informative of ending of the ringback tone section, and connecting the voice communication between the calling terminal and the called terminal when a response to paging is received from the called terminal; and (e) transmitting the ringback tone termination message to the calling terminal and transmitting unanswered messages to the calling terminal when no response to the paging is received from the called terminal.

According to another aspect of the present invention, there is provided a system for providing a terminal-based ringback tone substitute service to a calling terminal requesting voice communication with a called terminal, the system including a caller-side MSC for transmitting a ringback tone start message to the calling terminal when a request for an originating call for the voice communication is received from the calling terminal, the ringback tone start message informative of beginning of a ringback tone section, the caller-side MSC transmitting a ringback tone termination message to the calling terminal when call setup with a receiver-side MSC is completed or when a notification regarding a VMS is received, the ringback tone termination message informative of ending of the ringback tone section; a receiver-side MSC for paging the called terminal when a request for the call setup is received from the caller-side MSC, the receiver-side MSC completing the call setup with the caller-side MSC when a response to paging is received from the called terminal, the receiver-side MSC requesting the VMS and notifying the caller-side MSC of the VMS when no response to the paging is received from the called terminal; and a VMS server for transmitting unanswered messages to the calling terminal by using the receiver-side MSC and the caller-side MSC when the receiver-side MSC requests the VMS.

According to another aspect of the present invention, there is provided a method for providing a terminal-based ringback tone substitute service to a calling terminal originating a call to a called terminal in a system having an intelligent network and a VMS server, the intelligent network having an HLR, a caller-side MSC, a receiver-side MSC, an SSP, and an SCP, the method including the steps of (a) requesting the receiver-side MSC to conduct call setup when the caller-side MSC receives a request for an originating call for voice communication from the calling terminal; (b) notifying the intelligent network of a service trigger by the receiver-side MSC, receiving a ringback tone service indicator, and forwarding the ringback tone service indicator to the caller-side MSC; (c) transmitting a ringback tone start message to the calling terminal by the caller-side MSC, the ringback tone start message informative of beginning of a ringback tone section, and requesting the receiver-side MSC to page the called terminal; (d) paging the called terminal by the receiver-side MSC; (e) notifying the intelligent network of a response to paging when the receiver-side MSC has received the response from the called terminal, receiving a request for call connection between the calling terminal and the called terminal, and completing call setup with the caller-side MSC; (f) transmitting a ringback tone termination message by the caller-side MSC, the ringback tone termination message informative of ending of the ringback tone section, and relaying the voice communication between the calling terminal and the called terminal; (g) notifying the intelligent network of the service trigger when the receiver-side MSC has not received the response, receiving a VMS indicator, forwarding the VMS indicator to the caller-side MSC, and requesting the VMS server to provide a VMS; and (h) transmitting the ringback tone termination message to the calling terminal by the caller-side MSC and transmitting unanswered messages to the calling terminal by the VMS server.

According to another aspect of the present invention, there is provided a system for providing a terminal-based ringback tone substitute service to a calling terminal requesting voice communication with a called terminal, the system including an SCP for determining whether to conduct a ringback tone service or a VMS when requested to determine and responding; an SSP for requesting the SCP to provide a service when notified of a service trigger, receiving a response, and transmitting a ringback tone service indicator and a VMS indicator; a caller-side MSC for requesting a receiver-side MSC to conduct call setup when a request for an originating call for the voice communication is received from the calling terminal, the caller-side MSC transmitting a ringback tone start message to the calling terminal when a ringback tone service indicator is received, the ringback tone start message informative of beginning of a ringback tone section, the caller-side MSC transmitting a ringback tone termination message to the calling terminal when call setup with the receiver-side MSC is completed or when the VMS indicator is received from the receiver-side MSC, the ringback tone termination message informative of ending of the ringback tone section; a receiver-side MSC for notifying the SSP of the service trigger when a request for the call setup is received from the caller-side MSC, the receiver-side MSC forwarding the ringback tone service indicator to the caller-side MSC and paging the called terminal when the ringback tone service indicator is received, the receiver-side MSC completing the call setup with the caller-side MSC when a response to paging is received from the called terminal, the receiver-side MSC notifying the SSP of the service trigger, receiving the VMS indicator, forwarding the VMS indicator to the caller-side MSC, and requesting the VMS when no response to the paging is received from the called terminal; and a VMS server for transmitting unanswered messages to the calling terminal by using the receiver-side MSC and the caller-side MSC when the receiver-side MSC requests the VMS.

According to another aspect of the present invention, there is provided a mobile communication terminal for playing sounds or sound sources, including an antenna for transmitting/receiving RF signals; a mobile communication processing unit for conducting mobile communication with a mobile communication network by using the antenna; a speaker for outputting sounds or sound sources; a memory for storing a number of ringback tone substitute sound sources; an audio codec unit having an audio codec so as to decode the ringback tone substitute sound sources by the audio codec and play the ringback tone substitute sound sources; a voice codec unit having a voice codec so as to decode the sounds by the voice codec and play the sounds; and a control unit for originating a call for voice communication with a called terminal to the mobile communication network, the control unit controlling the audio codec unit so as to activate the audio codec and transmitting the ringback tone substitute sound sources to the audio codec unit when a ringback tone start message informative of beginning of a ringback tone section is received from the mobile communication network, the control unit controlling the voice codec unit so as to activate the voice codec and transmitting sounds or unanswered messages received from the mobile communication network to the voice codec unit when a ringback tone termination message informative of ending of the ringback tone section is received from the mobile communication network.

According to another aspect of the present invention, there is provided a method for playing sounds or sound sources received from a mobile communication network by a mobile communication terminal having an antenna, a mobile communication processing unit, a speaker, a memory, an audio codec unit, a voice codec unit, and a control unit, the method including the steps of (a) originating a call to the mobile communication network, activating a voice codec, and processing signals received from the mobile communication network by using the voice codec; (b) confirming if a pre-stored ringback tone substitute sound source is found when a ringback tone start message informative of beginning of a ringback tone section is received from the mobile communication network; (c) selecting the ringback tone substitute sound source when it is confirmed in step (b) that the ringback tone substitute sound source has been found, activating an audio codec, decoding the ringback tone substitute sound source by the audio codec, and playing the ringback tone substitute sound source; and (d) activating the voice codec when a ringback tone termination message informative of ending of the ringback tone section is received from the mobile communication network and processing signals received from the mobile communication network by the voice codec.

According to another aspect of the present invention, there is provided a mobile communication terminal for downloading a sound source from a sound source download server and playing a ringback tone substitute, the mobile communication terminal including an antenna for transmitting/receiving RF signals; a mobile communication processing unit for conducting mobile communication with a mobile communication network by using the antenna; a speaker for outputting sounds and a ringback tone substitute sound source; a memory for storing the sound source downloaded from the sound source download server; an audio codec unit having an audio codec so as to decode the ringback tone substitute sound source by the audio codec and play the ringback tone substitute sound source; a voice codec unit having a voice codec so as to decode the sounds by the voice codec and play the sounds; a sound source conversion unit for converting the sound source into the ringback tone substitute sound source; and a control unit for downloading the sound source from the sound source download server by using the mobile communication processing unit, storing the sound source in the memory, and determining whether or not to designate the sound source as the ringback tone substitute sound source, the control unit designating the sound source as the ringback tone substitute sound source when the sound source can be played as the ringback tone substitute, the control unit controlling the sound source conversion unit so as to convert the sound sources into the ringback tone substitute sound source when the sound source cannot be played as the ringback tone substitute sound source and designating the sound source as the ringback tone substitute sound source.

According to another aspect of the present invention, there is provided a method for downloading a sound source from a sound source download server and playing a ringback tone substitute by a control unit in a mobile communication terminal having an antenna, a mobile communication processing unit, a memory, an audio codec unit, a voice codec unit, a sound source conversion unit, a control unit, and a speaker, the method including the steps of (a) accessing the sound source download server and downloading the sound source by using the mobile communication processing unit; (b) determining whether or not to designate the sound source as a ringback tone substitute sound source; (c) confirming if the sound source can be played as the ringback tone substitute when the sound source is designated as the ringback tone substitute sound source; (d) converting the sound source into the ringback tone substitute sound source by using the sound source conversion unit when the sound source cannot be played as the ringback tone substitute; and (e) designating the sound source as the ringback tone substitute sound source.

BRIEF DESCRIPTION OF THE DRAWINGS

The foregoing and other aspects, features and advantages of the present invention will become more apparent from the following detailed description when taken in conjunction with the accompanying drawings in which.

BEST MODE FOR CARRYING OUT THE INVENTION

Figure 1:
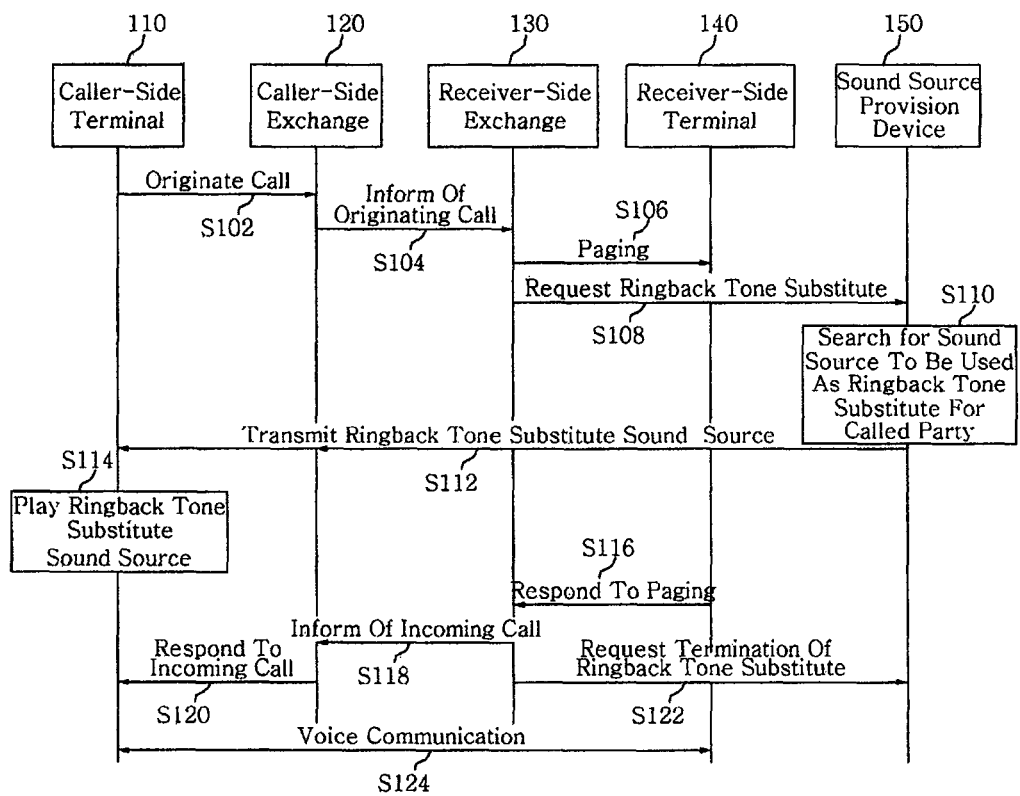
FIG. 1 is a flowchart showing a conventional method for providing a ringback tone substitute.

Hereinafter, exemplary embodiments of the present invention will be described in detail with reference to the accompanying drawings. In the following description and drawings, the same reference numerals are used to designate the same or similar components, and so repetition of the description on the same or similar components will be omitted. In addition, a detailed description of known functions and configurations incorporated herein is omitted to avoid making the subject matter of the present invention unclear.

Figure 2:
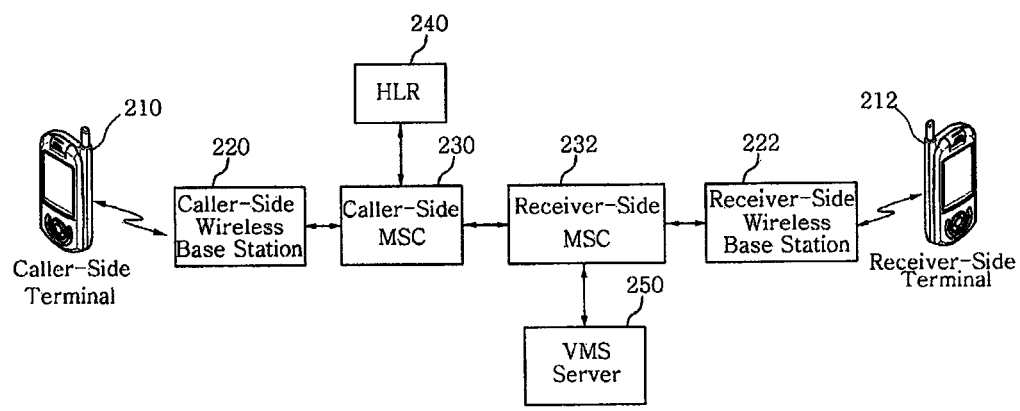
FIG. 2 is a block diagram showing the brief construction of a system for providing a terminal-based ringback tone substitute according to a first embodiment of the present invention.

FIG. 2 is a block diagram showing the brief construction of a system for providing a terminal-based ringback tone substitute according to a first embodiment of the present invention.

A system for providing a terminal-based ringback tone substitute according to a first embodiment of the present invention includes a calling terminal 210, a called terminal 212, a calling wireless base station 220, a receiver-side wireless base station 222, a caller-side MSC (Mobile Switching Center) 230, a receiver-side MSC 232, an HLR (Home Location Register) 240, and a VMS (Voice Message Service) server 250.

It will be assumed for convenience of description that a mobile communication network includes the caller-side wireless base station 220, the receiver-side wireless base station 222, the caller-side MSC 230, the receiver-side MSC 232, the HLR 240, and the VMS server 250 and provides the called and calling terminals 110 and 112 with desired mobile communication services including a voice communication service, a wireless data service, a ringback tone substitution service, and a VMS.

The calling and called terminals 210 and 212 are mobile communication terminals adapted for voice communication with each other via the mobile communication network or with conventional wired telephones via a public switched telephone network (not shown). The mobile communication terminals may be PDAs (Personal Digital Assistants), cellular phones, PCS (Personal Communication Service) phones, handheld PCs, GSM (Global System for Mobile) phones, WCDMA (Wideband CDMA) phones, CDMA-2000 phones, or MBS (Mobile Broadband System) phones which are expected to be used in the $4^{th}$ generation system currently under discussion.

According to the first embodiment of the present invention, the calling terminal 210 is a mobile communication terminal used by the calling party for voice communication with the called party who uses the called terminal 212. Particularly, the calling terminal 210 uses a mobile communication service provided by the mobile communication network so as to access a specific server on the network, download a ringback tone substitute sound source, which has been encoded by a voice codec or an audio codec, and store it. Based on a key input of the calling party, the calling terminal 210 originates a call to the mobile communication network and receives a ringback tone start message, which informs of the beginning of a ringback tone section, and a ringback tone termination message, which informs of the ending of the ringback tone section, from the mobile communication network. According to the corresponding message, the calling terminal 210 activates the voice and audio codecs, and decodes and plays sounds, VMS messages (e.g. unanswered messages), ringback tone substitute sound sources encoded by a voice codec, and ringback tone substitute sound sources encoded by an audio codec.

More particularly, upon receiving a ringback tone start message from the mobile communication network, the calling terminal 210 according to the first embodiment of the present invention activates the audio codec, decodes a pre-stored ringback tone substitute sound source with the audio codec, and plays it. Upon receiving a ringback tone termination message from the mobile communication network, the calling terminal 210 activates the voice codec, decodes sounds or VMS messages, which are received from the mobile communication network, with the voice codec, and plays them.

The called terminal 112 according to the first embodiment of the present invention is a mobile communication terminal used by the called party and adapted to receive paging from the receiver-side MSC 232 and inform the receiver-side MSC 232 of a response to the paging according to the called party's selection.

The caller-side and receiver-side wireless base stations 220 and 222 of the mobile communication network include a BTS (Base Station Transmission System) and a BSC (Base Station Controller), respectively. The caller-side and receiver-side wireless base stations 220 and 222 allocate wireless channels to the calling and called terminals 210 and 212 and relay signals and data, which are transmitted/received between the calling and called terminals 210 and 212 and the caller-side and receiver-side MSCs 230 and 232.

The caller-side and receiver-side MSCs 230 and 232 of the mobile communication network are adapted to process basic and additional services, incoming and originating calls made by subscribers, procedures for location registration and handoff, interworking with other networks, etc. The caller-side and receiver-side MSCs 230 and 232 use their own HLRs 240 so as to obtain information regarding mobile communication subscribers of the calling and called terminals 210 and 212, i.e. calling and called parties, as well as information regarding the location and condition of respective mobile communication terminals.

When the caller-side MSC 230 according to the first embodiment of the preset invention receives the telephone number of the called terminal 212 (i.e. called number) from the calling terminal 210 and a request for an originating call at the same time, the caller-side MSC 230 uses the caller-side wireless base station 220 to allocate wireless channels to the calling terminal 210, and uses the HLR 240 to locate the called terminal 212 and obtain routing information regarding the receiver-side MSC 232.

In addition, the caller-side MSC 230 according to the first embodiment of the present invention checks if the called number has an error and, if so, transmits an error message to the calling terminal 210 so as to inform that the called number has an error. If the called number has no error, the caller-side MSC 230 transmits a ringback tone start message to the calling terminal 210 so as to inform that a ringback tone section has begun. As used herein, an error of the called number refers to a case in which the called number does not conform to the telephone number system of the mobile communication network or wireless telephone network or a case in which the number is not used any more even if it conforms to the system.

Furthermore, the caller-side MSC 230 according to the first embodiment of the present invention requests the receiver-side MSC 232 to conduct call setup so that an originating call is processed. When the called terminal 212 responds and when call setup is completed with regard to the receiver-side MSC 232, the caller-side MSC 230 transmits a ringback tone termination message to the calling terminal 210 so as to inform that the ringback tone section has ended.

If the called terminal 212 does not respond to the call setup request for processing an originating call, the caller-side MSC 230 according to the first embodiment of the present invention transmits the above-mentioned ringback tone termination message to the calling terminal 210 after being informed that a VMS has begun (i.e. VMS is available) by the receiver-side MSC 232.

Upon receiving a call setup request from the caller-side MSC 230, the receiver-side MSC 232 according to the first embodiment of the present invention pages the called terminal 212 and checks if the called terminal 212 responds to the paging. If so, the receiver-side MSC 232 informs the caller-side MSC 230 of the response and completes the call setup with the caller-side MSC 230.

If the called terminal 212 does not respond to the paging, the receiver-side MSC 232 according to the first embodiment of the present invention checks if a predetermined waiting period has elapsed, i.e. whether or not a predetermined time has passed after the called terminal 212 has been paged. If so, the receiver-side MSC 232 requests the VMS server 250 to provide a VMS and informs the caller-side MSC 230 that the VMS has begun. The process of checking if the waiting time has passed is optional, and the waiting time may be one minute, for example.

The HLR 240 acts as a database storing service profiles related information regarding mobile communication subscribers. Particularly, the HLR 240 is adapted to recognize and delete registration particulars of respective mobile communication terminals, as well as to locate them. Furthermore, the HLR 240 stores the telephone number of mobile communication subscribers using respective mobile communication terminals, the MIN (Mobile Identification Number), the ESN (Electronic Serial Number), information regarding the service type (e.g. if the ringback tone substitution service has been subscribed to), etc.

The VMS server 250 provides an electronic mail service based on voice (i.e. VMS). As used herein, the VMS is provided in such a manner that, when the calling terminal 210 has requested voice communication with the called terminal 212 while the called party is absent, a voice guide message is transmitted to the calling terminal 210 so that a voice message can be stored selectively and that the called party can hear the voice message when voice communication is possible.

When requested to provide a VMS by the receiver-side MSC 232, the VMS server 250 according to a preferred embodiment of the present invention transmits a message to the calling terminal 210 via the called and caller-side MSCs 232 and 230 so as to inform that the called terminal 212 does not respond.

Figure 3A:
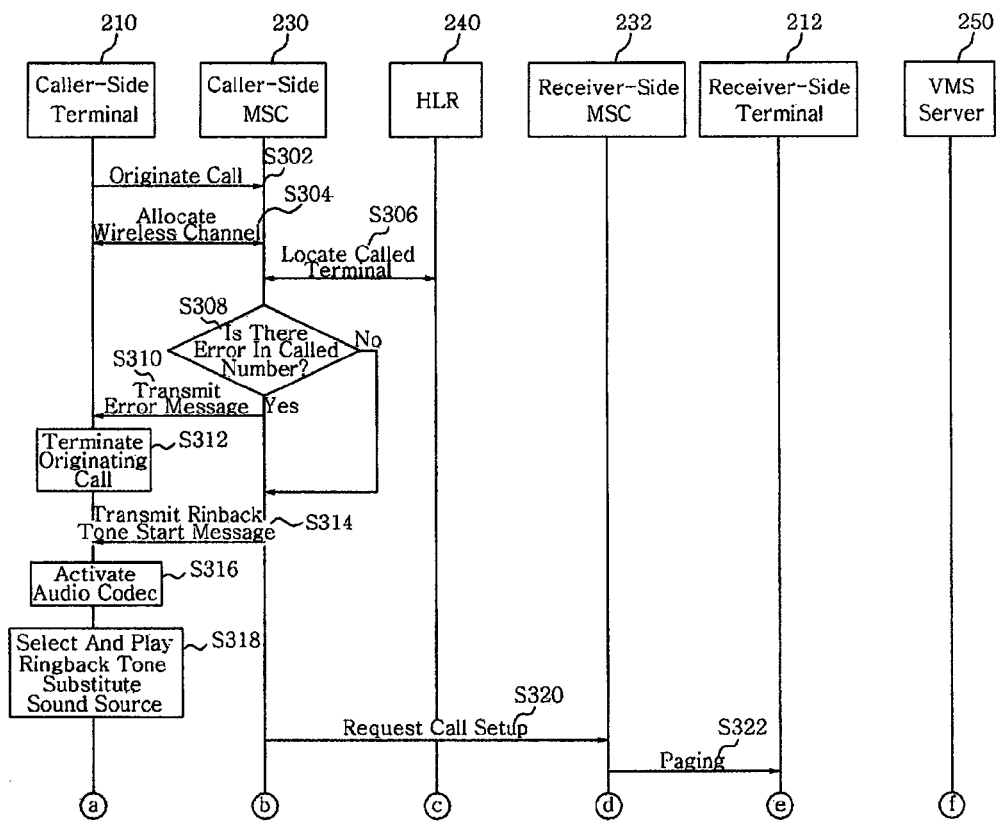
FIGS. 3a and 3b are flowcharts showing a method for providing a terminal-based ringback tone substitute according to the first embodiment of the present invention.
Figure 3B:
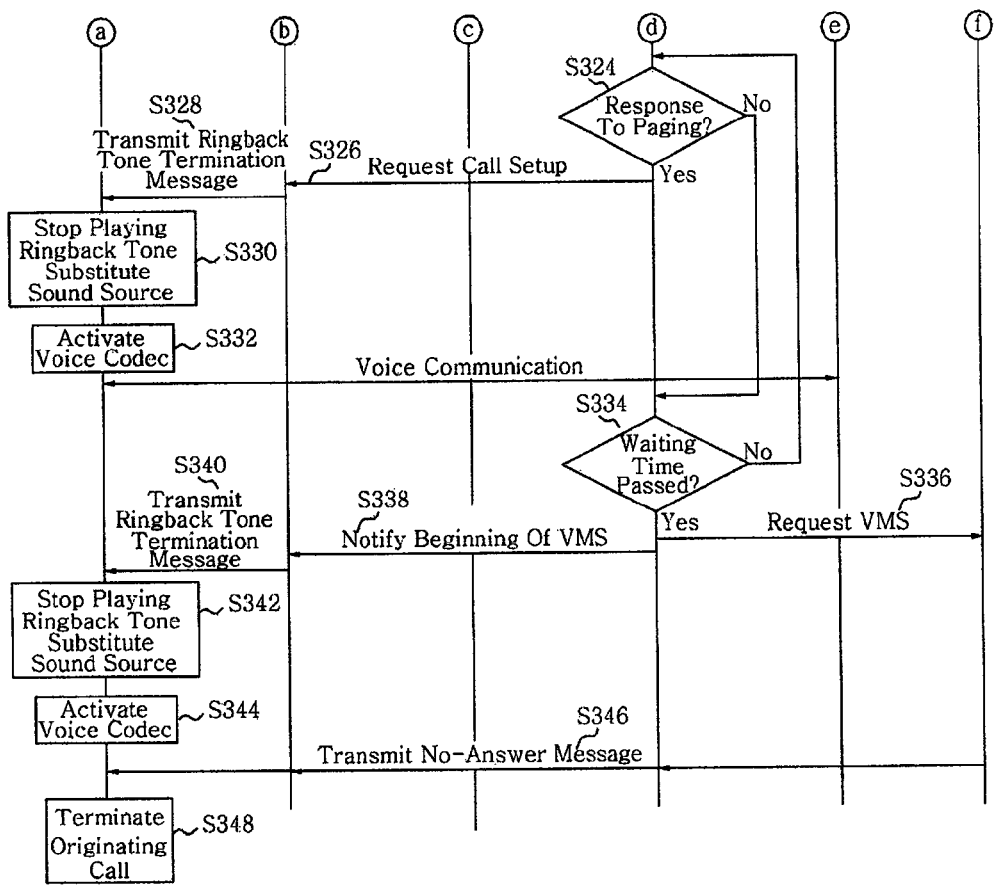

FIGS. 3a and 3b are flowcharts showing a method for providing a terminal-based ringback tone substitute according to the first embodiment of the present invention.

A method for providing the calling terminal 210 with a terminal-based ringback tone substitute by using the system for providing a terminal-based ringback tone substitute according to the first embodiment of the present invention, which has been described with reference to FIG. 2, will now be described.

When the calling terminal 210 originates a call for voice communication with the called terminal 212 (S302), the caller-side MSC 230 allocates wireless channels to the calling terminal 210 (S304), and locates the called terminal 212 by using the HLR 240 (S306) so as to obtain routing information regarding the receiver-side MSC 232.

Then, the caller-side MSC 230 analyzes the called number, i.e. telephone number used by the calling terminal 210 to originate a call, and determines if the number has an error (S308). If so, the caller-side MSC 230 transmits an error message to the calling terminal 210 (S310). After receiving the error message, the calling terminal 210 informs of it and terminates the originating call (S312).

If the called number has no error, the caller-side MSC 230 transmits a ringback tone start message to the calling terminal 210 (S314). After receiving the ringback tone start message, the calling terminal 210 activates its audio codec, searches for a pre-stored ringback tone substitute sound source, and plays the selected sound source by the audio codec (S318). In order to process the originating call, the caller-side MSC 230 requests the receiver-side MSC 232 to conduct call setup (S320). The receiver-side MSC 232 then pages the called terminal 212 (S322).

After paging the called terminal 212, the receiver-side MSC 232 checks if the called terminal 212 responds to the paging (S324). If so, the receiver-side MSC 232 completes the call setup with the caller-side MSC 230 (S336) The caller-side MSC 230 then transmits a ringback tone termination message to the calling terminal 210 (S328). After receiving the ringback tone termination message, the calling terminal 210 stops playing the ringback tone substitute sound source (S330), and activates its voice codec (S332).

When it has been confirmed in step S324 that the called terminal 212 does not respond to the paging, the receiver-side MSC 232 checks if a predetermined waiting time has passed (S334). If not, the receiver-side MSC 324 checks again if there is a response to the paging. If the waiting time has passed, the receiver-side MSC 232 requests the VMS server 250 to provide a VMS (S336), and informs the caller-side MSC 230 that the VMS has begun (S338).

After being informed of the beginning of the VMS, the caller-side MSC 230 transmits a ringback tone termination message to the calling terminal 210 (S340). The calling terminal 210 then stops playing the ringback tone substitute sound source, which has been played in step S318, (S342), and activates its voice codec (S344). After being requested to provide a VMS by the receiver-side MSC 232 in step S336, the VMS server 250 transmits unanswered messages to the calling terminal 210 via the called and caller-side MSCs 232 and 230 (S346). The calling terminal 210 then decodes the unanswered messages by the activated voice codec, plays them, and terminates the originating call (S348).

As mentioned above, the system and method for providing a terminal-based ringback tone substitute according to the first embodiment of the present invention are operated as follows: the mobile communication network determines whether or not the called number has an error and whether or not the called party responds so that a ringback tone substitute sound source, which has been downloaded and stored in advance by the calling terminal 210 and which has been encoded by an audio codec, can be played stably. Based on the determination, the network receives messages informative of the beginning and ending of a ringback tone section (i.e. a ringback tone start message and a ringback tone termination message) so that the calling terminal 210 can properly activate the voice and audio codecs. The calling terminal 210 then decodes the ringback tone substitute sound source by the audio codec, as well as sounds and unanswered messages by the voice codecs, and plays them.

It is to be noted that, in the case of the system and method for providing a terminal-based ringback tone substitute according to the first embodiment of the present invention, which has been described with reference to FIGS. 2 and 3, the caller-side and receiver-side MSCs 230 and 232 handle the overall processing. In this case, a number of MSCs of the mobile communication network must be updated at a considerable cost.

A system and a method for providing a terminal-based ringback tone substitute by using an intelligent network according to a second embodiment of the present invention, which has been focused to minimize the update of MSCs, will now be described with reference to FIGS. 4 and 5.

Figure 4:
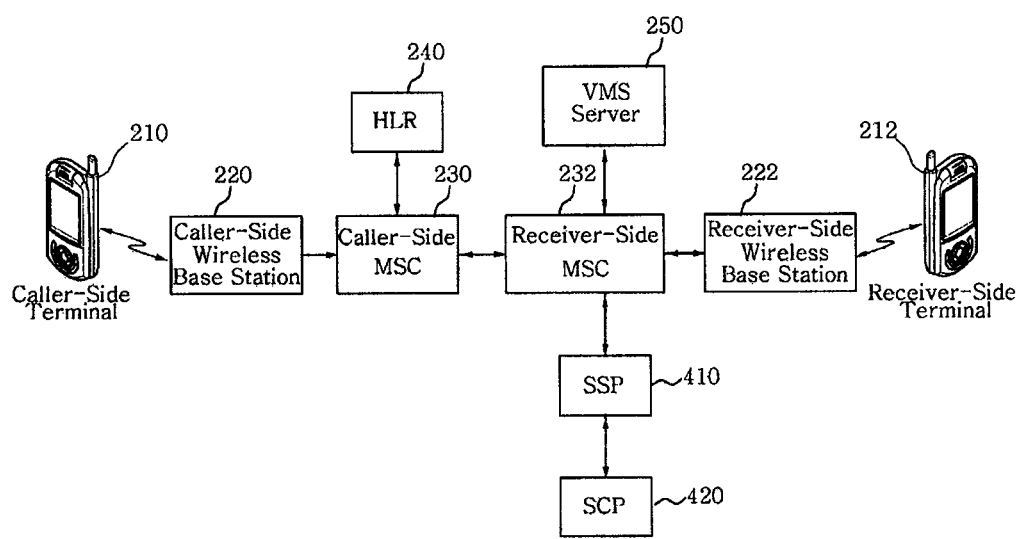
FIG. 4 is a block diagram showing the brief construction of a system for providing a terminal-based ringback tone substitute according to a second embodiment of the present invention.

FIG. 4 is a block diagram showing the brief construction of a system for providing a terminal-based ringback tone substitute by using an intelligent network according to a second embodiment of the present invention.

The system for providing a terminal-based ringback tone substitute by using an intelligent network according to the second embodiment of the present invention includes a calling terminal 210, a called terminal 212, a caller-side wireless base station 220, a receiver-side wireless base station 222, a caller-side MSC 230, a receiver-side MSC 232, an HLR 240, and a VMS 250, which have the same construction as has been described with reference to FIG. 2, as well as an SSP (Service Switching Point) 410 and an SCP (Service Control Point) 420, which constitute an intelligent network.

Detailed descriptions of the calling terminal 210, the called terminal 212, the caller-side wireless base station 220, the receiver-side wireless base station 222, the HLR 240, and the VMS server 250 have been given with reference to FIG. 2, and will be omitted herein. In addition, descriptions of the caller-side MSC 230 and the receiver-side MSC 232 with reference to FIG. 4 will be focused on differences from those according to the first embodiment.

The SSP 410 according to the second embodiment of the present invention is a device of the intelligent, which is adapted to recognize an intelligent network service during normal call processing and transmit it to the SCP 420. Particularly, when informed by the receiver-side MSC 232 that a service has been triggered, the SSP 410 requests the SCP 420 to provide the service. After receiving a response to the request, the SSP 410 transmits service indicators corresponding to the service, i.e. a ringback tone service indicator or a VMS indicator, to the receiver-side MSC 232.

The SCP 420 according to the second embodiment of the present invention is a device of the intelligent network, which holds applied logic regarding various services and related data so as to control corresponding services. When requested to provide a service by the SSP 410, the SCP 420 analyzes stored data, determines the corresponding service by using the applied logic, and transmits the resulting response to the SSP 410. Particularly, when the SSP 410 requests a service, the SCP 420 confirms whether the corresponding subscriber has subscribed to a ringback tone substitution service or a VMS service, and sends a corresponding response to the SSP 410.

Figure 5A:
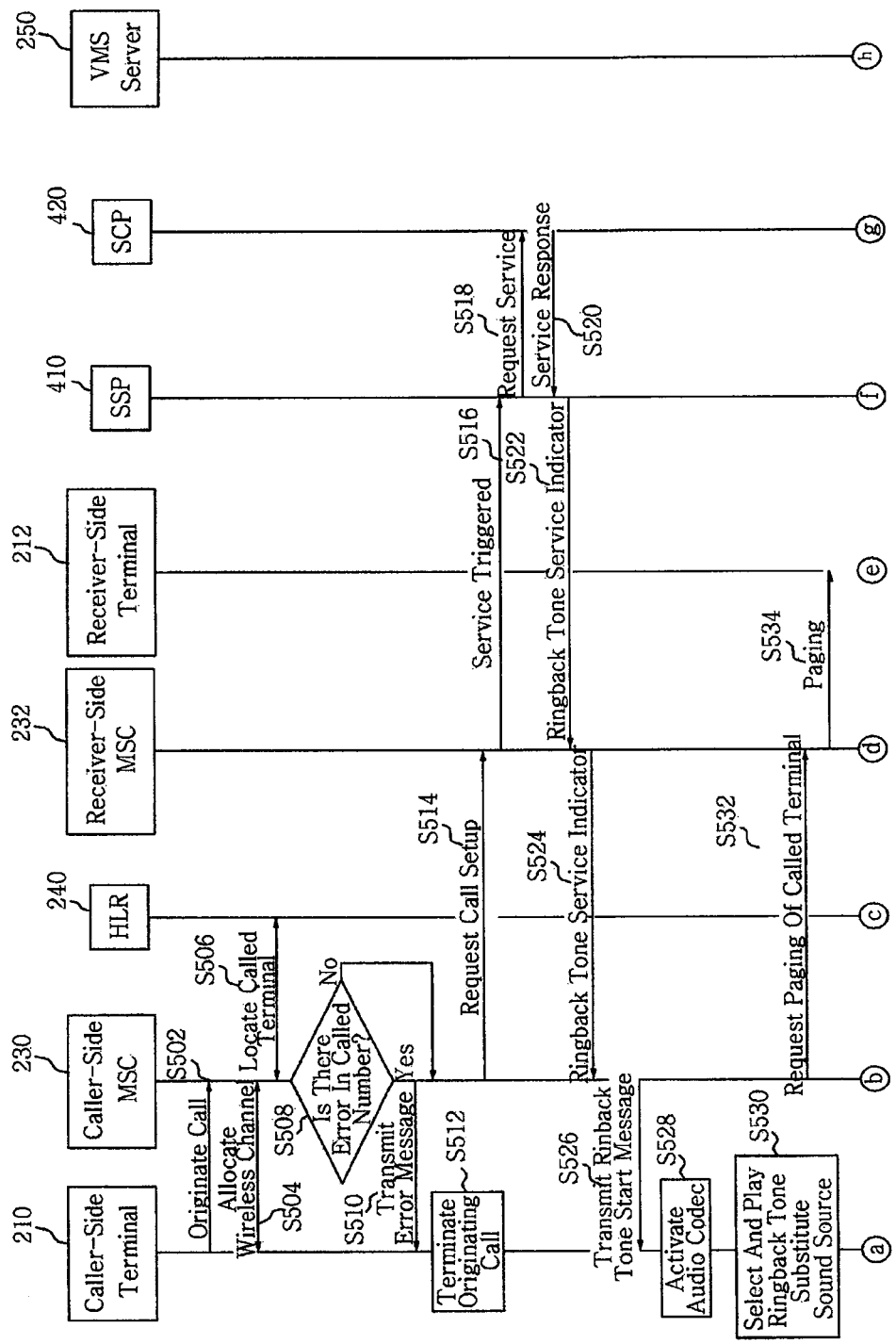
FIGS. 5a and 5b are flowcharts showing a method for providing a terminal based ringback tone substitute according to the second embodiment of the present invention.
Figure 5B:
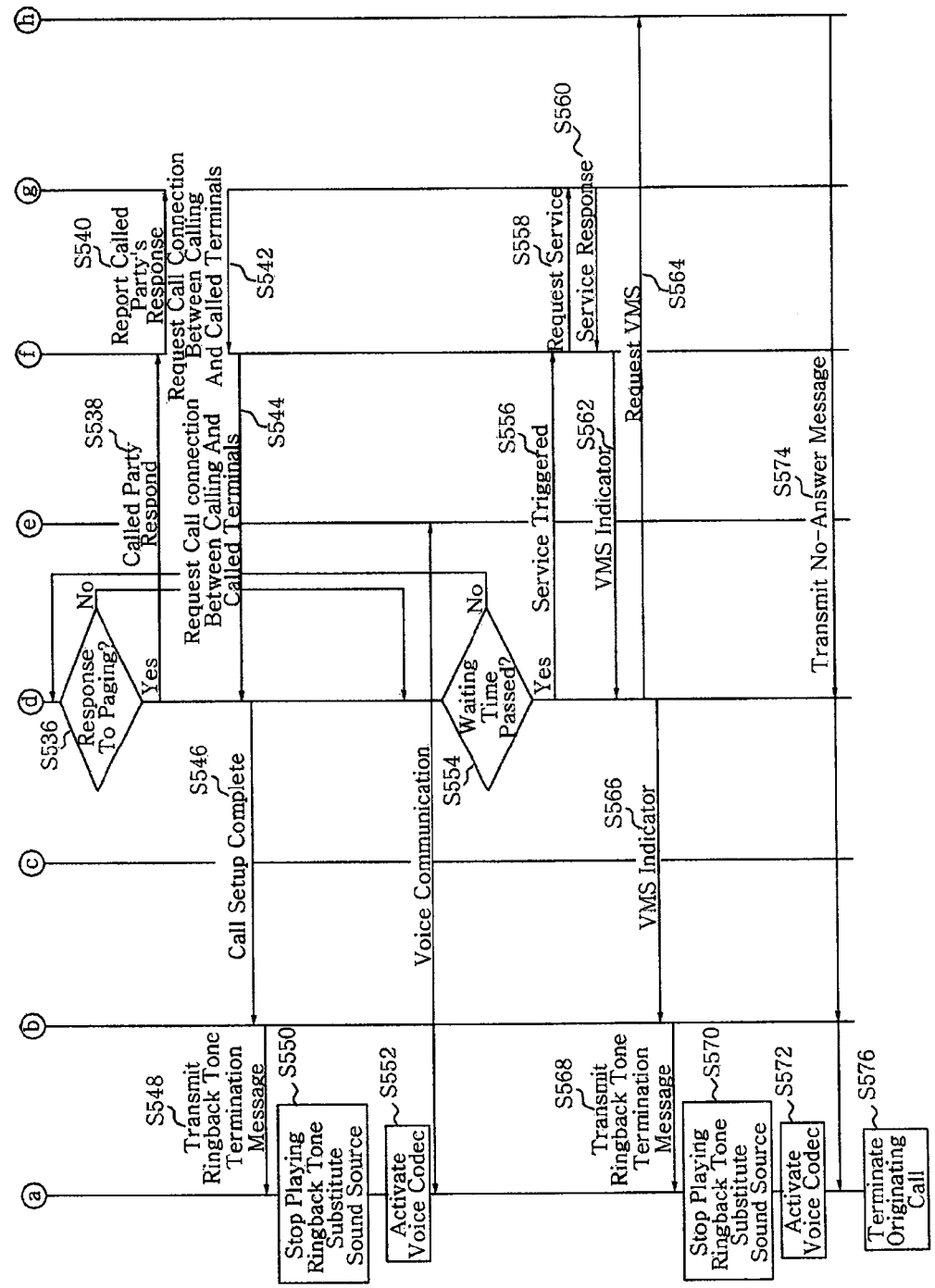

FIGS. 5a and 5b are flowcharts showing a method for providing a terminal-based ringback tone substitute according to the second embodiment of the present invention.

A method for providing a terminal-based ringback tone substitute by using a system for providing a terminal-based ringback tone substitute according to the second embodiment of the present invention, which has been described with reference to FIG. 4, will now be described.

Steps S502 to S512 are the same as steps S302 and S312, which have been described with reference to FIG. 3, and repeated description thereof will be omitted herein.

When it is confirmed in step S508 that the called number has no error, the caller-side MSC 230 requests the receiver-side MSC 232 to conduct call setup so that the originating call is processed (S514). The caller-side MSC 232 then informs the intelligent network that a service has been triggered, in order to request service processing (S516).

After being informed that the service has been triggered, the SSP 410 requests the SCP 420 to provide the service in order to inquire about the service (S518). The SCP 420 then identifies the requested service and transmits a service response, which informs that the service is a ringback tone substitution service, to the SSP 410 (S520). After receiving the response, the SSP 410 transmits a ringback tone service indicator, which informs that the calling or called party has subscribed to the ringback tone substitution service, to the receiver-side MSC 232 (S522). After receiving the ringback tone service indicator, the receiver-side MSC 232 relays it to the caller-side MSC 230 (S524). The caller-side MSC 230 then transmits a ringback tone start message (S526).

After receiving the ringback tone start message, the calling terminal 210 activates its audio codec (S528), selects a pre-stored ringback tone substitute sound source, decodes it by the audio codec, and plays it (S530).

After transmitting the ringback tone start message in step S526, the caller-side MSC 230 requests the receiver-side MSC 232 to page the called terminal 212 (S532). The receiver-side MSC 232 then pages the called terminal 212 (S534), and checks if the called terminal 212 responds to the paging (S536).

If it is confirmed in step S536 that the called terminal 212 responds to the paging, the receiver-side MSC 232 notifies the SSP 410 that the called party has responded (S538). The SSP 410 then forwards the notification to the SCP 420 (S540). After recognizing that the called party has responded, the SCP 420 requests that a call be connected between the calling and called terminals 210 and 212 (S542). The SSP 410 forwards the request to the receiver-side MSC 232 (S544).

After being requested to connect a call between the calling and called terminals 210 and 212, the receiver-side MSC 232 informs the caller-side MSC 230 of call setup completion (S546). The caller-side MSC 230 then transmits a ringback tone termination message to the calling terminal 210 (S548). After receiving the ringback tone termination message, the calling terminal 210 stops playing the ringback tone substitute sound source (S550), activates its voice codec (S552), decodes sounds for voice communication by the voice codec, and plays the sounds so as to conduct voice communication with the called terminal 212.

If it has been confirmed in step S536 that the called terminal 212 has not responded to the paging, the receiver-side MSC 232 checks if a predetermined waiting time has passed (S554). If it is confirmed in step S554 that the waiting time has not passed, the receiver-side MSC 232 checks again if the called terminal 212 responds to the paging. If the waiting time has passed, the receiver-side MSC 232 informs the SSP 410 that a service has been triggered (S556).

After being informed of the triggered service, the SSP 410 requests the SCP 420 to provide the service in order to inquire about the service (S558). The SCP 420 then identifies the requested service and transmits a service response, which informs that the service is a VMS, to the SSP 410 (S560). After receiving the response, the SSP 410 transmits a VMS indicator, which informs that the calling or called party has subscribed to the VMS, to the receiver-side MSC 232 (S562).

After receiving the VMS indicator, the receiver-side MSC 232 requests the VMS 250 to provide the calling terminal 210 with the VMS (S564), and relays it to the caller-side MSC 230 (S566). The caller-side MSC 230 then transmits a ringback tone termination message (S568). After receiving the ringback tone termination message, the calling terminal 210 stops playing the ringback tone substitute sound source (S570), and activates its voice codec (S572).

After being requested to provide the VMS in step S564, the VMS server 250 transmits unanswered messages to the calling terminal 210 (S574). The calling terminal 210 then decodes the unanswered messages (i.e. voice messages) by the activated voice codec, plays them, and terminates the originating call (S576).

As mentioned above, according to the second embodiment of the present embodiment, an intelligent network is used to provide a terminal-based ringback tone substitute so that the update of MSCs can be minimized.

In summary, according to the first and second embodiments of the present invention, which have been described with reference to FIGS. 3 to 5, the mobile communication network transmits control messages, which indicate the beginning and ending of a ringback tone section, to the calling terminal 210, which then stably plays the ringback tone substitute sound source and enables the subscriber to use a voice communication service and a VMS.

A mobile communication terminal and a method for stably playing a ringback tone substitute sound source, sounds, and voice messages by using control messages, which are transmitted by the mobile communication network so as to indicate the beginning and ending of a ringback tone section, according to a third embodiment of the present invention will now be described with reference to FIGS. 6 and 7.

Figure 6:
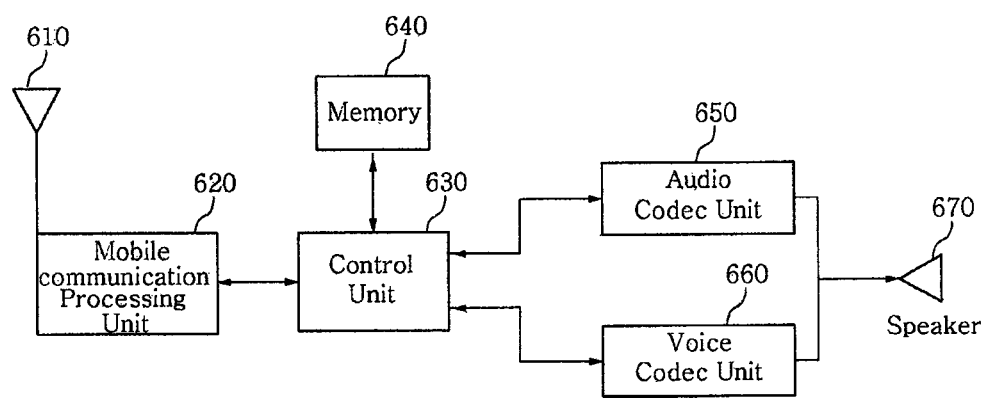
FIG. 6 is a block diagram showing the brief construction of a mobile communication terminal adapted to play a terminal-based ringback tone substitute according to a third embodiment of the present invention.

FIG. 6 is a block diagram showing the brief construction of a mobile communication terminal adapted to play a terminal-based ringback tone substitute according to the third embodiment of the present invention.

The mobile communication terminal adapted to play a terminal-based ringback tone substitute according to the third embodiment of the present invention includes an antenna 610, a mobile communication processing unit 620, a control unit 630, a memory 640, an audio codec unit 650, a voice codec unit 660, and a speaker 670. The mobile communication terminal adapted to play a terminal-based ringback tone substitute according to the third embodiment of the present invention may be implemented as the calling terminal 110, which has been described with reference to FIG. 2 or 4, and will now be referred to as the calling terminal 110.

The antenna 610 is adapted to transmit/receive mobile communication signals, i.e. RF signals, to/from the mobile communication network via the air.

The mobile communication processing unit 620 includes an RF signal processing means for demodulating RF signals so as to create demodulated signals and demodulating wireless channels so as to separate signals from data, and a baseband conversion means incorporating a digital-analog conversion function, an analog-digital conversion function, and a function of converting high-frequency signals into baseband signals or vice versa, in order to conduct mobile communication with the mobile communication network.

The control unit 630 is a control means (e.g. microprocessor) for controlling the overall operation of the calling terminal 110. Upon receiving a mobile communication signal via the mobile communication processing unit 620, the control unit 630 according to the third embodiment of the present invention analyzes the signal and, if the signal is a signal message (i.e. ringback tone start message), controls the audio codec unit 650 so as to activate the audio codec. Then, the control unit 630 selects an arbitrary ringback tone substitute sound source, which is stored in the memory, or transmits a ringback tone substitute sound source, which has been designated as the ringback tone substitute, to the audio codec unit 650 so that it decodes the sound source by the activated audio codec and plays it.

Upon receiving a ringback tone termination message, the control unit 630 controls the voice codec unit 660 so as to activate the audio or voice codec. The control unit 630 forwards mobile communication signals, i.e. sounds or voice messages (unanswered messages) received from the mobile communication network via the mobile communication processing unit 620, to the voice codec unit 660 so that it decodes them by the activated voice codec and plays them.

The control unit 630 uses a wireless data service, which is provided by the mobile communication network according to the calling party's selection, so as to access a specific server on the network, download a number of ringback tone substitute sound sources, and store them in the memory.

The memory 640 is a data storage means consisting of a RAM or a flash memory, for example. The memory 640 stores driving software executed by the control unit 630 so as to control the operation of the calling terminal 110 and data necessary for it. In addition, the memory 640 stores additional software for executing various additional functions used by the calling terminal 110, user data inputted and uploaded by the calling party, etc. The memory 640 according to the third embodiment of the present invention stores at least one ringback tone substitute sound source downloaded from a specific server on the network.

The audio codec unit 650 has an audio codec implemented on a software or hardware basis, such as MP3, AAC+, or AMR-WB. The audio codec unit 650 activates or deactivates the audio codec under the control of the control unit 630. Upon receiving a ringback tone substitute sound source after activating the audio codec, the audio codec unit 650 decodes the ringback tone substitute sound source by using the activated audio codec and plays it via the speaker 670.

The voice codec unit 660 has a voice codec implemented on a software or hardware basis, such as EVRC. The voice codec unit 660 activates or deactivates the voice codec under the control of the control unit 630. Upon receiving signals, i.e. sounds or unanswered messages from the mobile communication network after activating the voice codec, the voice codec unit 660 decodes the sounds or unanswered messages by using the activated voice codec and plays them via the speaker 670.

The speaker 670 is a means for converting electric signals into audible sounds.

Figure 7:
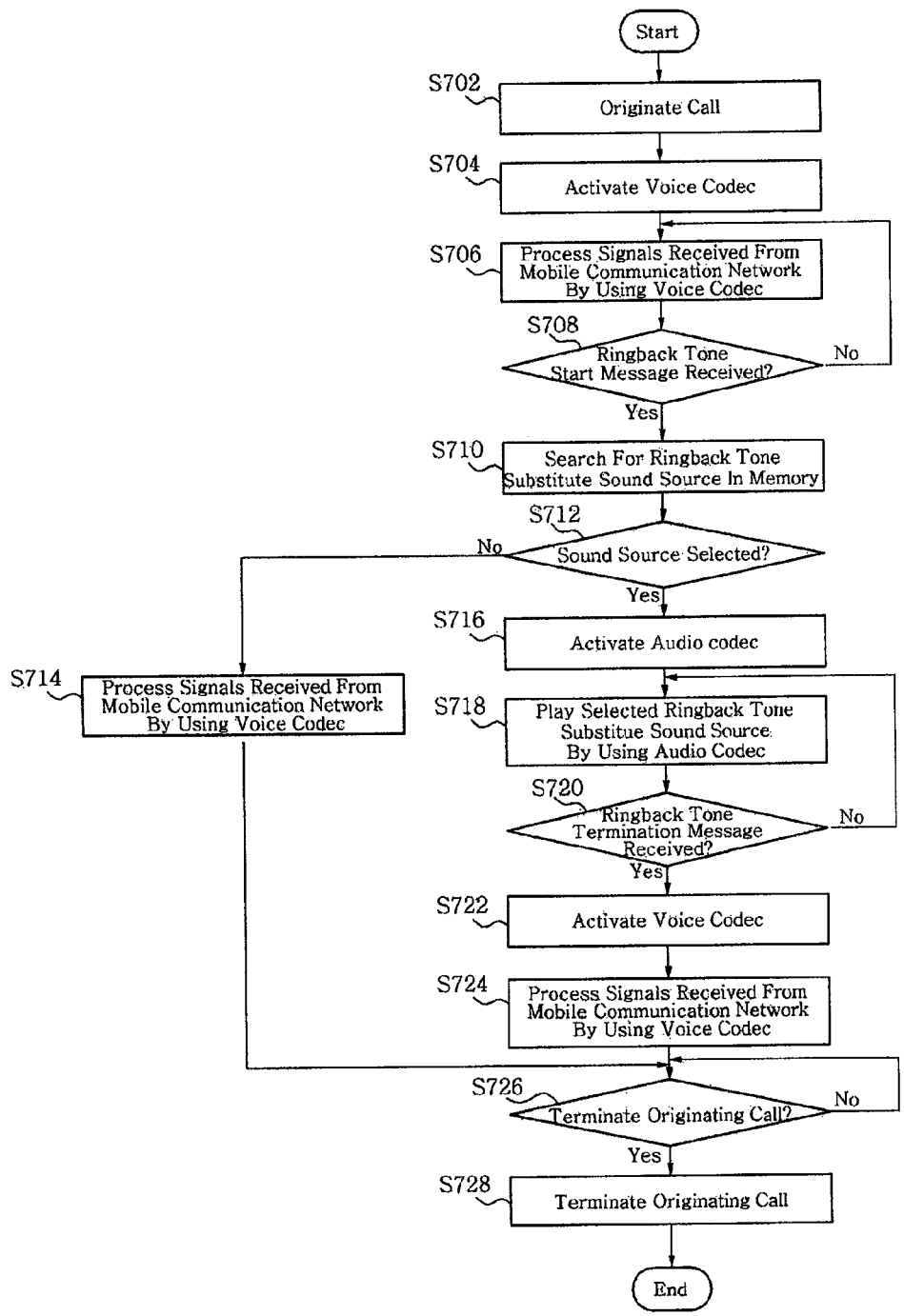
FIG. 7 is a flowchart showing a method for playing a terminal-based ringback tone substitute according to the third embodiment of the present invention.

FIG. 7 is a flowchart showing a method for playing a terminal-based ringback tone substitute according to the third embodiment of the present invention.

When the calling party operates the calling terminal 210 for communication with the called party, the calling terminal 210 originates a call to the mobile communication network (S702). After originating the call, the calling terminal 210 activates its voice codec (S704), and processes signals, which are received from the mobile communication network, by using the voice codec (S706).

The calling terminal 210 checks if a ringback tone start message, which informs that a ringback tone section begins, is received from the mobile communication network (S708). If no ringback tone start message is received, the calling terminal 210 continues the processing based on the voice codec as in step S706. If the ringback tone start message is received, the calling terminal 210 searches for a ringback tone substitute sound source in the memory 640 (S710), and selects a sound source. Various methods may be employed to select a ringback tone substitute sound source by the calling terminal 210. Particularly, when a single ringback tone substitute sound source is stored in the memory 640, it is simply selected. When a number of ringback tone substitute sound sources are stored, one is selected according to the calling party's setting. Alternatively, a specific ringback tone substitute sound source is arbitrarily selected from them.

In some cases, no ringback tone substitute sound source is stored in the memory 640. Therefore, the calling terminal 210 confirms whether or not a ringback tone substitute sound source has been selected (S712).

If it is confirmed in step S712 that no ringback tone substitute sound source has been selected, the calling terminal 210 continuously activates the voice codec, which has been activated in step S704, processes signals received from the mobile communication network by using the voice codec (S714), and proceeds to step S726.

If it is confirmed in step S712 that a ringback tone substitute sound source has been selected, the calling terminal 210 activates its audio codec (S716), decodes the selected ringback tone substitute sound source by using the activated audio codec, and plays it (S718). The ringback tone substitute sound source is preferably played via the receiver, from which sounds are heard during voice communication.

After decoding the ringback tone substitute sound source by the audio codec and playing it, the calling terminal 210 checks if a ringback tone termination message is received (S720). This is for the purpose of providing for a case in which the calling terminal 212 responds and starts voice communication, or a case in which the calling terminal 212 does not respond and switches to a voice service (e.g. VMS service).

If it is confirmed in step S720 that no ringback tone termination message is received, the calling terminal 210 continuously plays the ringback tone substitute sound source as in step S718. If a ringback tone termination message is received, the calling terminal 210 activates the voice codec (S722), decodes signals received from the mobile communication network, i.e. sounds for voice communication or unanswered messages for a VMS service, by using the activated voice codec, and plays them (S724).

The calling terminal 210 checks if the calling party terminates the voice communication or VMS service, i.e. if originating call is terminated, (S726). If the originating call is not terminated, the calling terminal 210 continuously processes signals received from the mobile communication network by using the voice codec. If the originating call is terminated, the calling terminal 210 terminates the originating call (S728).

As mentioned above, the terminal adapted to play a terminal-based ringback tone substitute sound source according to the third embodiment of the present invention, i.e. the calling terminal 210 carries both voice and audio codecs, downloads a high-quality ringback tone substitute sound source encoded by the audio codec, stores it, activates the voice and audio codecs according to control messages received from the mobile communication network, and plays the high-quality ringback tone substitute sound source in a stable manner.

Figure 8:
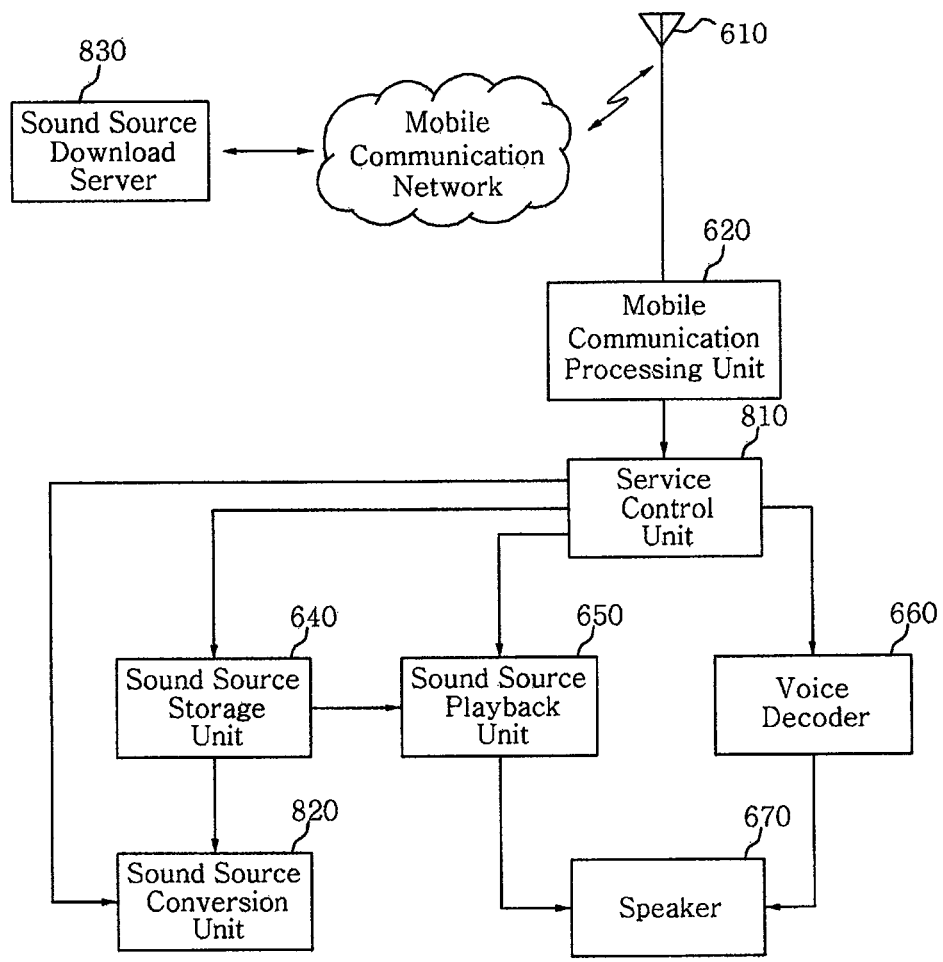
FIG. 8 is a block diagram showing the brief construction of a mobile communication terminal adapted to play a terminal-based ringback tone substitute according to a fourth embodiment of the present invention.

FIG. 8 is a block diagram showing the brief construction of a mobile communication terminal adapted to play a terminal-based ringback tone substitute according to a fourth embodiment of the present invention.

The mobile communication terminal adapted to play a terminal-based ringback tone substitute according to the fourth embodiment of the present invention includes all components of the mobile communication terminal adapted to play a terminal-based ringback tone substitute according to the third embodiment of the present invention, which has been described with reference to FIG. 6, as well as a sound source conversion unit 820.

The antenna 610, the mobile communication processing unit 620, the memory 640, the audio codec unit 650, the voice codec unit 660, and the speaker 670 have the same or similar functions as those described with reference to FIG. 6, and repeated description thereof will be omitted herein. However, the control unit 810 incorporates not only the functions described with reference to FIG. 6, but also other functions, which will now be described in detail together with the sound source conversion unit 820. The mobile communication terminal adapted to play a terminal-based ringback tone substitute according to the fourth embodiment of the present invention may be implemented as the calling terminal 110, which has been described with reference to FIG. 2 or 4, and will now be referred to as the calling terminal 110.

The control unit 810 is a control means (e.g. microprocessor) for controlling the overall operation. The control unit 810 according to the fourth embodiment of the present invention uses the mobile communication processing unit 620 so as to access a sound source download server 830 based on a wireless Internet service provided by the mobile communication network. The control unit 810 then downloads various types of sound sources from the sound source download server 830 and stores them in the memory 640.

The control unit 810 may not only separately download sound sources from the sound source download server 830, but also download packages of sound sources in respective genres. The downloaded sound sources include those which can be used without limitations (i.e. they have no term of use), and those which can only be used for a period of time (i.e. the right of using them is limited).

When the mobile communication subscriber operates the calling terminal 110, the control unit 810 accesses the sound source download server 830 via the mobile communication network and downloads a sound source selected by the subscriber. Alternatively, the subscriber can select sound sources to be downloaded or desired type or genre in advance so that the control unit 810 automatically accesses the sound source download server 830 everyday or at a predetermined time during a week (e.g. when the amount of data communication is small) and downloads sound sources selected by the subscriber or those corresponding to the selected type or genre.

In addition, the control unit 810 according to the fourth embodiment of the present invention can ask the mobile communication subscriber if he/she wants to designate the sound source, which has been downloaded from the sound source download server 830 and stored in the memory 640, as the ringback tone substitute sound source. If the subscriber wants to do so, the control unit 810 confirms whether or not the sound source can be played as the ringback tone substitute sound source and, if so, designates it as the ringback tone substitute sound source. If the sound source cannot be played as the ringback tone substitute sound source, the control unit 810 converts it into a sound source, which can be played as the ringback tone substitute sound source, by using the sound source conversion unit 820, and designates it as the ringback tone substitute sound source.

When the control unit 810 converts a downloaded sound source into one that can be played as the ringback tone substitute sound source by using the sound source conversion unit 820, the sound source may be authenticated, if necessary. This is because, in some cases, the downloaded sound source may be an illegal one, i.e. the subscriber is not authorized to use it. In order to avoid designating an illegal sound source as the ringback tone substitute sound source, the control unit 810 uses its own authentication algorithm or relies on a user computer, which is connected via wired communication, to access an authentication server operated by the terminal manufacturer or sound source maker, and authenticates the right to use the sound source. Preferably, the control unit 810 uses a sound source as the ringback tone substitute sound source only after the right to use the sound source is successfully authenticated.

When a downloaded sound source is designated as the ringback tone substitute sound source, the control unit 810 adds a flag to the designated sound source and indicates that it is a ringback tone substitute sound source, in order to facilitate a following search for a sound source to be used as the ringback tone substitute.

When the control unit 810 receives a mobile communication signal via the mobile communication processing unit 620 after downloading a sound source, designating it as the ringback tone substitute sound source, and storing it in the memory 640 in the above-mentioned manner, the control unit 810 analyzes the mobile communication signal and, if it is a signal message (i.e. ringback tone start message), controls the audio codec unit 650 so as to activate the audio codec. Then, the control unit 810 arbitrarily selects a ringback tone substitute sound source stored in the memory, or transmits a ringback tone substitute sound source, which has been designated as the ringback tone substitute, to the audio codec unit 650 so that it decodes the sound source by the activated audio codec and plays it.

Upon receiving a ringback tone termination message, the control unit 630 controls the voice codec unit 660 so as to activate the audio or voice codec accordingly. The control unit 630 forwards mobile communication signals received from the mobile communication network via the mobile communication processing unit 620, i.e. sounds or voice messages (unanswered messages), to the voice codec unit 660 so that it decodes them by the activated voice codec and plays them.

The sound source conversion unit 820 is a conversion means for converting sound sources of various formats into those of a format that can be played as a ringback tone substitute by the audio codec unit 650. Particularly, the control unit 810 downloads a sound source from the sound source download server 830, designates it as the ringback tone substitute sound source, and stores it in the memory 640. When the control unit 810 receives a ringback tone start message, the sound source is played by the audio codec unit 650. However, the type of audio codecs supported by the audio codec unit 650 may differ from that of the audio codec used to encode the sound source. In such a case, the sound source must be decoded and encoded again by one of audio codecs supported by the audio codec unit 650. This task is handled by the sound source conversion unit 820.

In addition, sound sources downloaded from the sound source download server 830 by the control unit 810 are not suited to be played as ringback tone substitutes. Particularly, sound sources downloaded by the control unit 810 include various types of music, such as popular, classical, and jazz. It takes a long time to play this type of music, and the file size of the corresponding sound source is large. However, ringback tone substitutes tend to be played for a very short period of time, and their file size is small. Therefore, the sound source conversion unit 820 modifies the playing time, file size, etc. of the sound sources so that a specific part of the music (i.e. part which the mobile communication subscriber wants to play as the ringback tone substitute) as the ringback tone substitute.

The sound source download server 830 is a type of a network server, which stores various kinds of sound sources so that a mobile communication terminal can download desired sound sources from it. The sound source download server 830 may be implemented as a wireless Internet portal server, for example.

Figure 9:
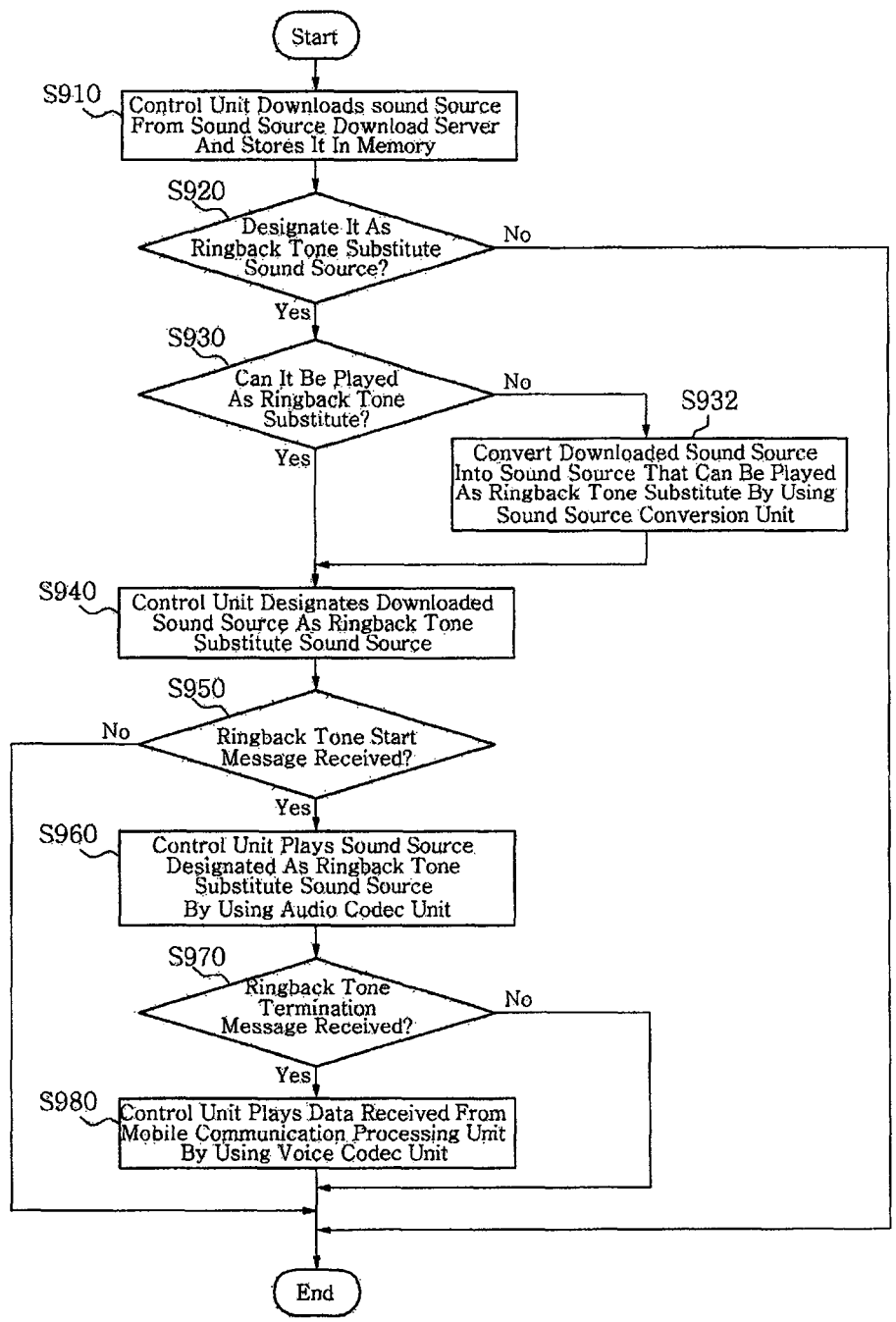
FIG. 9 is a flowchart showing a method for playing a terminal-based ringback tone substitute according to the fourth embodiment of the present invention.

FIG. 9 is a flowchart showing a method for playing a terminal-based ringback tone substitute according to the fourth embodiment of the present invention.

Based on operations of the mobile communication subscriber or according to predetermined setup information, the control unit 810 of the calling terminal 110 periodically downloads sound sources from the sound source download server and stores them in the memory 640 (S910).

The control unit 810 receives a confirmation from the mobile communication subscriber regarding whether or not he/she wants to designate a downloaded sound source as the ringback tone substitute sound source (S920). If the subscriber does not want, the sound source is stored in the memory 640. If the subscriber wants to designate the sound source as the ringback tone substitute sound source, the control unit 810 checks if the sound source can be played as a ringback tone substitute by the audio codec unit 650 (S930).

If it is confirmed in step S930 that the sound source cannot be played as a ringback tone substitute, the control unit 810 converts the sound source into one that can be played as a ringback tone substitute by using the sound source conversion unit 820 (S932). If the sound source can be played as a ringback tone substitute, it is designated as the ringback tone substitute sound source (S940).

After designating the downloaded sound source as the ringback tone substitute sound source, the control unit 810 checks if the calling terminal 110 receives a ringback tone start message from the mobile communication network after originating a call and communicating with the mobile communication network (S950). If a ringback tone start message is received, the control unit 810 searches the memory 640 to find a sound source having a flag indicating that it is a ringback tone substitute sound source. When such a sound source is found, the control unit 810 retrieves it from the memory 640 and plays it by using the audio codec unit 650 (S960). As such, the calling terminal 110 can play a ringback tone substitute, which has been downloaded by the user and designated as the ringback tone substitute sound source according to his/her taste, by using the audio codec. As a result, a high-quality ringback tone substitute is provided.

The control unit 810 checks if a ringback tone termination message is received from the mobile communication network while the downloaded sound source is played by the audio codec unit 650 (S970). If a ringback tone termination message is received, the control unit 810 is supposed to play all data, which is received via the mobile communication processing unit 620 at a later time, by using the voice codec unit 660 (S980). Particularly, it can be said that, when the control unit 810 has received a ringback tone termination message from the mobile communication network, the called terminal 212 has responded to paging and received the call, the called terminal 212 has not responded, or the called terminal 212 was unable to respond (because it was powered off) so that unanswered messages must be received from the mobile communication network. Considering this, the control unit 810 designates the voice codec unit 650 as the transfer path of data received from the mobile communication processing unit 620 so that sounds received from the called terminal 212 or unanswered messages received from the VMS server 250 can be played. In this manner, sounds or unanswered messages are played by the voice codec unit 650.

As mentioned above, according to the fourth embodiment of the present invention, a sound source, which has been downloaded and stored, undergoes authentication and conversion procedures, and is played as a ringback tone substitute by the calling terminal 110.

While this invention has been described in connection with what is presently considered to be the most practical and exemplary embodiment, it is to be understood that the invention is not limited to the disclosed embodiment and the drawings, but, on the contrary, it is intended to cover various modifications and variations within the spirit and scope of the appended claims.

INDUSTRIAL APPLICABILITY

As can be seen from the foregoing, according to the present invention, the mobile communication terminal can play a high-quality ringback tone substitute without being affected by the voice channel environment.

The mobile communication network notifies the mobile communication terminal of the beginning and ending of a ringback tone section so that the mobile communication terminal can stably play the ringback tone substitute sound source, sounds for voice communication, and VMS messages.

The notification of the beginning and ending of a ringback tone section by the mobile communication network is still possible even in an exceptional situation, e.g. when the called number has an error or when the called party does not respond, so that the ringback tone substitute can be provided in a stable manner.

The mobile communication terminal can play sound sources of various formats, which have been downloaded from the outside, as the ringback tone substitute sound source. The mobile communication terminal goes through an authentication procedure so that an unauthorized sound source cannot be played as the ringback tone substitute. This prevents the playback of any illegal sound source as the ringback tone substitute.

The invention claimed is:

1. A method of providing a terminal-based ringback tone substitute service in a system having a caller-side Mobile Switching Center (MSC), a receiver-side MSC, a Home Location Register (HLR), and a Voice Message Service (VMS) server, the method comprising:

receiving a request for an originating call for voice communication with a called terminal from a calling terminal;

transmitting a ringback tone start message to the calling terminal, the ringback tone start message being a control message informative of beginning of a ringback tone section performed by the calling terminal, the ringback tone section comprising:

determining if a ringback tone substitute sound source is stored in the calling terminal;

after the determination that the ringback tone substitute sound source is stored in the calling terminal, activating an audio codec of the calling terminal, decoding the ringback tone substitute sound source by using the audio codec, and playing the ringback tone substitute sound source; and after the determination that the ringback tone substitute sound source is not stored in the calling terminal, activating a voice codec of the calling terminal, and processing signals received from the system by using the voice codec, the voice codec being different from the audio codec;

paging the called terminal;

transmitting a ringback tone termination message to the calling terminal, the ringback tone termination message being a control message informative of ending of the ringback tone section, and connecting the voice communication between the calling terminal and the called terminal when a response to paging is received from the called terminal, the connecting the voice communication comprising activating, by the calling terminal, the voice codec of the calling terminal, decoding sounds for the voice communication by using the voice codec, and playing the sounds; and transmitting the ringback tone termination message to the calling terminal and transmitting a voice guide message to the calling terminal when no response to the paging is received from the called terminal.

2. The method as claimed in claim 1, wherein the transmission of the ringback tone termination message comprises:

confirming if a called number has an error, the called number having been used by the calling terminal to request the voice communication;

transmitting an error message to the calling terminal, the error message informing that the called number has an error, when it is confirmed that the called number has an error; and transmitting the ringback tone start message to the calling terminal when it is confirmed that the called number has no error.

3. The method as claimed in claim 1, further comprising, when the calling terminal receives the ringback tone termination message, the calling terminal activating the voice codec, decoding the voice guide message by using the voice codec, and playing the voice guide message.

4. The method as claimed in claim 1, wherein the transmission of the ringback tone termination message and the voice guide message comprises:
confirming if a predetermined waiting time has passed when no response to the paging is received from the calling terminal; and
transmitting the ringback tone termination message to the calling terminal and transmitting the voice guide message to the calling terminal when it is confirmed that the waiting time has passed.

5. A system for providing a terminal-based ringback tone substitute service to a calling terminal requesting voice communication with a called terminal, the system comprising:
a caller-side Mobile Switching Center (MSC) for transmitting a ringback tone start message to the calling terminal when a request for an originating call for the voice communication is received from the calling terminal, the ringback tone start message informative of beginning of a ringback tone section, the caller-side MSC transmitting a ringback tone termination message to the calling terminal when call setup with a receiver-side MSC is completed or when a notification regarding a Voice Message Service (VMS) is received, the ringback tone termination message informative of ending of the ringback tone section;
a receiver-side MSC for paging the called terminal when a request for the call setup is received from the caller-side MSC, the receiver-side MSC completing the call setup with the caller-side MSC when a response to paging is received from the called terminal, the receiver-side MSC requesting the VMS and notifying the caller-side MSC of the VMS when no response to the paging is received from the called terminal; and
a VMS server for transmitting a voice guide message to the calling terminal by using the receiver-side MSC and the caller-side MSC when the receiver-side MSC requests the VMS,
wherein the calling terminal is configured to:
perform the ringback tone section, the ringback tone section comprising:
determining if a ringback tone substitute sound source is stored in the calling terminal;
after the determination that the ringback tone substitute sound source is stored in the calling terminal, activating an audio codec of the calling terminal, decoding the ringback tone substitute sound source by using the audio codec, and playing the ringback tone substitute sound source; and
after the determination that the ringback tone substitute sound source is not stored in the calling terminal, activating a voice codec of the calling terminal and processing signals received from the system by using the voice codec, the voice codec being different from the audio codec; and
after receiving the ringback tone termination message, activate the voice codec of the calling terminal, decode sounds for the voice communication or the voice guide message by using the voice codec, and play the sounds and the voice guide message.

6. The system as claimed in claim 5, wherein the caller-side MSC is adapted to confirm if a called number received from the calling terminal has an error and transmit an error message to the calling terminal when the called number has an error, the error message informing that the called number has an error.

7. The system as claimed in claim 5, wherein the receiver-side MSC is adapted to confirm if a predetermined waiting time has passed when no response to the paging is received and request the VMS only when the waiting time has passed.

8. A method for providing a terminal-based ringback tone substitute service to a calling terminal originating a call to a called terminal in a system having an intelligent network and a Voice Message Service (VMS) server, the intelligent network having a Home Location Register (HLR), a caller-side Mobile Switching Center (MSC), a receiver-side MSC, a Service Control Point (SSP), and a Service Control Point (SCP), the method comprising:
requesting the receiver-side MSC to conduct call setup when the caller-side MSC receives a request for an originating call for voice communication from the calling terminal;
notifying the intelligent network of a service trigger by the receiver-side MSC, receiving a ringback tone service indicator, and forwarding the ringback tone service indicator to the caller-side MSC;
transmitting a ringback tone start message to the calling terminal by the caller-side MSC, the ringback tone start message informative of beginning of a ringback tone section performed by the calling terminal, and requesting the receiver-side MSC to page the called terminal, the ringback tone section comprising:
determining if a ringback tone substitute sound source is stored in the calling terminal;
after the determination that the ringback tone substitute sound source is stored in the calling terminal, activating an audio codec of the calling terminal, decoding the ringback tone substitute sound source by using the audio codec, and playing the ringback tone substitute sound source; and
after the determination that the ringback tone substitute sound source is not stored in the calling terminal, activating a voice codec of the calling terminal and processing signals received from the system by using the voice codec, the voice codec being different from the audio codec;
paging the called terminal by the receiver-side MSC;
notifying the intelligent network of a response to paging when the receiver-side MSC has received the response from the called terminal, receiving a request for call connection between the calling terminal and the called terminal, and completing call setup with the caller-side MSC;
transmitting a ringback tone termination message by the caller-side MSC, the ringback tone termination message informative of ending of the ringback tone section, and relaying the voice communication between the calling terminal and the called terminal, the connecting the voice communication comprising activating, by the calling terminal, the voice codec of the calling terminal, decoding sounds for the voice communication by using the voice codec, and playing the sounds;
notifying the intelligent network of the service trigger when the receiver-side MSC has not received the response, receiving a VMS indicator, forwarding the VMS indicator to the caller-side MSC, and requesting the VMS server to provide a VMS; and transmitting the ringback tone termination message to the calling terminal by the caller-side MSC and transmitting a voice guide message to the calling terminal by the VMS server.

9. The method as claimed in claim 8, wherein the requesting the receiver-side MSC to conduct call setup comprises:
receiving a request for the originating call from the calling terminal and confirming if a called number used to request the voice communication has an error;
transmitting an error message to the calling terminal when it is confirmed that the called number has an error, the error message informing that the called number has an error; and
requesting the receiver-side MSC to conduct call setup when it is confirmed that the called number has no error.

10. The method as claimed in claim 8, wherein the transmission of the ringback tone termination message and the voice guide message comprises, when the calling terminal receives the ringback tone termination message, the calling terminal activating the voice codec, decoding the voice guide message by using the voice codec, and playing the voice guide message.

11. A system for providing a terminal-based ringback tone substitute service to a calling terminal requesting voice communication with a called terminal, the system comprising:
a Service Control Point (SCP) for determining whether to conduct a ringback tone service or a VMS when requested to determine and responding;
a Service Control Point (SSP) for requesting the SCP to provide a service when notified of a service trigger, receiving a response, and transmitting a ringback tone service indicator and a Voice Message Service (VMS) indicator;
a caller-side Mobile Switching Center (MSC) for requesting a receiver-side MSC to conduct call setup when a request for an originating call for the voice communication is received from the calling terminal, the caller-side MSC transmitting a ringback tone start message to the calling terminal when a ringback tone service indicator is received, the ringback tone start message informative of beginning of a ringback tone section, the caller-side MSC transmitting a ringback tone termination message to the calling terminal when call setup with the receiver-side MSC is completed or when the VMS indicator is received from the receiver-side MSC, the ringback tone termination message informative of ending of the ringback tone section;
a receiver-side MSC for notifying the SSP of the service trigger when a request for the call setup is received from the caller-side MSC, the receiver-side MSC forwarding the ringback tone service indicator to the caller-side MSC and paging the called terminal when the ringback tone service indicator is received, the receiver-side MSC completing the call setup with the caller-side MSC when a response to paging is received from the called terminal, the receiver-side MSC notifying the SSP of the service trigger, receiving the VMS indicator, forwarding the VMS indicator to the caller-side MSC, and requesting the VMS when no response to the paging is received from the called terminal; and
a VMS server for transmitting a voice guide message to the calling terminal by using the receiver-side MSC and the caller-side MSC when the receiver-side MSC requests the VMS wherein the calling terminal is configured to:
perform the ringback tone section, the ringback tone section comprising:
determining if a ringback tone substitute sound source is stored in the calling terminal;
after the determination that the ringback tone substitute sound source is stored in the calling terminal, activating an audio codec of the calling terminal, decoding the ringback tone substitute sound source by using the audio codec, and playing the ringback tone substitute sound source; and
after the determination that the ringback tone substitute sound source is not stored in the calling terminal, activating a voice codec of the calling terminal and processing signals received from the system by using the voice codec, the voice codec being different from the audio codec; and
after receiving the ringback tone termination message, activate the voice codec of the calling terminal, decode sounds for the voice communication or the voice guide message by using the voice codec, and play the sounds and the voice guide message.

12. The system as claimed in claim 11, wherein the caller-side MSC is adapted to confirm if a called number received from the calling terminal has an error and transmit an error message to the calling terminal when the called number has an error, the error message informing that the called number has an error.

13. The system as claimed in claim 11, wherein the receiver-side MSC is adapted to confirm if a predetermined waiting time has passed when no response to the paging is received and notify the SSP of the service trigger only when the waiting time has passed.

14. A mobile communication terminal for playing sounds or sound sources, comprising:
an antenna for transmitting/receiving RF signals;
a mobile communication processing unit for conducting mobile communication with a mobile communication network by using the antenna;
a speaker for outputting sounds or sound sources;
a memory for storing a number of ringback tone substitute sound sources;
an audio codec unit having an audio codec so as to decode the ringback tone substitute sound sources by the audio codec and play the ringback tone substitute sound sources;
a voice codec unit having a voice codec so as to decode the sounds by the voice codec and play the sounds, the voice codec being different from the audio codec; and
a control unit for originating a call for voice communication with a called terminal to the mobile communication network, the control unit being configured to:
determine if at least one of the ringback tone substitute sound sources is stored in the memory;
after the determination that at least one of the ringback tone substitute sound sources is stored in the memory, activate the audio codec and transmit the at least one of the ringback tone substitute sound sources to the audio codec unit in response to a ringback tone start message informative of beginning of a ringback tone section received from the mobile communication network;
after the determination that the ringback tone substitute sound sources are not stored in the memory, activate the voice codec to process signals received from the mobile communication network in response to the ringback tone start message; and activate the voice codec and transmit sounds or a voice guide message received from the mobile communication network to the voice codec unit in response to a ringback tone termination message informative of ending of the ringback tone section received from the mobile communication network.

15. The mobile communication terminal as claimed in claim 14, wherein the control unit is adapted to download a number of ringback tone substitute sound sources from the mobile communication network by using the mobile communication processing unit and store the ringback tone substitute sound sources in the memory.

16. The mobile communication terminal as claimed in claim 14, wherein the control unit is adapted to select a desired ringback tone substitute sound source from the ringback tone substitute sound sources and transmit the selected ringback tone substitute sound source to the audio codec unit.

17. The mobile communication terminal as claimed in claim 14, wherein the control unit is adapted to transmit a ringback tone substitute sound source to the audio codec unit, the ringback tone substitute sound source having been selected as a ringback tone substitute from the ringback tone substitute sound sources by a user.

18. The mobile communication terminal as claimed in claim 14, wherein the mobile communication network is adapted to confirm if a called number used to request the originating call has an error and transmit the ringback tone start message to the mobile communication terminal only when the called number has no error.

19. The mobile communication terminal as claimed in claim 14, wherein the mobile communication network is adapted to page the called terminal, transmit the ringback tone termination message to the mobile communication terminal when the called terminal responds to paging, and relay the voice communication between the calling terminal and the called terminal.

20. The mobile communication terminal as claimed in claim 14, wherein the mobile communication network is adapted to page the called terminal, transmit the ringback tone termination message to the mobile communication terminal when the called terminal does not respond to paging, and transmit the voice guide message as a VMS to the mobile communication terminal.

21. A method for playing sounds or sound sources received from a mobile communication network by a mobile communication terminal having an antenna, a mobile communication processing unit, a speaker, a memory, an audio codec unit, a voice codec unit, and a control unit, the method comprising the steps of:
(a) originating a call to the mobile communication network, activating a voice codec, and processing signals received from the mobile communication network by using the voice codec;
(b) confirming if a pre-stored ringback tone substitute sound source is found when a ringback tone start message informative of beginning of a ringback tone section is received from the mobile communication network;
(c1) selecting the ringback tone substitute sound source when it is confirmed in step (b) that the ringback tone substitute sound source has been found, activating an audio codec, decoding the ringback tone substitute sound source by the audio codec, and playing the ringback tone substitute sound source, the audio codec being different from the voice codec;
(c2) processing signals received from the mobile communication network by the voice codec when it is confirmed in step (b) that no ringback tone substitute sound source has been found; and
(d) activating the voice codec when a ringback tone termination message informative of ending of the ringback tone section is received from the mobile communication network and processing signals received from the mobile communication network by the voice codec.

22. A mobile communication terminal for downloading a sound source from a sound source download server and playing a ringback tone substitute, the mobile communication terminal comprising:
an antenna for transmitting/receiving RF signals;
a mobile communication processing unit for conducting mobile communication with a mobile communication network by using the antenna;
a speaker for outputting sounds and a ringback tone substitute sound source;
a memory for storing the sound source downloaded from the sound source download server;
an audio codec unit having an audio codec so as to decode the ringback tone substitute sound source by the audio codec and play the ringback tone substitute sound source;
a voice codec unit having a voice codec so as to decode the sounds by the voice codec and play the sounds;
a sound source conversion unit for converting the sound source into the ringback tone substitute sound source; and
a control unit for downloading the sound source from the sound source download server by using the mobile communication processing unit, storing the sound source in the memory, and determining whether or not to designate the sound source as the ringback tone substitute sound source, the control unit designating the sound source as the ringback tone substitute sound source when the sound source can be played as the ringback tone substitute, the control unit controlling the sound source conversion unit so as to convert the sound sources into the ringback tone substitute sound source when the sound source cannot be played as the ringback tone substitute sound source and designating the sound source as the ringback tone substitute sound source.

23. The mobile communication terminal as claimed in claim 22, wherein the control unit originates a call for voice communication with a called terminal to the mobile communication network, the control unit controls the audio codec unit so as to activate the audio codec and transmit the ringback tone substitute sound source to the audio codec unit when a ringback tone start message informative of beginning of a ringback tone section is received from the mobile communication network, and the control unit controls the voice codec unit so as to activate the voice codec and transmit sounds or a voice guide message received from the mobile communication network to the voice codec unit when a ringback tone termination message informative of ending of the ringback tone section is received from the mobile communication network.

24. The mobile communication terminal as claimed in claim 22, wherein the control unit is adapted to authenticate a right to use the sound source and designate the sound source as the ringback tone substitute sound source only when the right is successfully authenticated.

25. The mobile communication terminal as claimed in claim 22, wherein the control unit is adapted to add a flag to the sound source so as to indicate that the sound source is the ringback tone substitute sound source when the sound source is designated as the ringback tone substitute sound source.

26. The mobile communication terminal as claimed in claim 25, wherein the control unit is adapted to check the flag of the sound source stored in the memory so as to confirm if the memory stores the ringback tone substitute sound source when the sound source is played as the ringback tone substitute sound source.

27. The mobile communication terminal as claimed in claim 22, wherein the control unit is adapted to periodically access the sound source download server and download the sound source by using information determined by a mobile communication subscriber.

28. The mobile communication terminal as claimed in claim 22, wherein the control unit is adapted to download the sound source as a sound source package from the sound source download server, the sound source package being created by packaging sound sources in respective types or genres.

29. A method for downloading a sound source from a sound source download server and playing a ringback tone substitute by a control unit in a mobile communication terminal having an antenna, a mobile communication processing unit, a memory, an audio codec unit, a voice codec unit, a sound source conversion unit, a control unit, and a speaker, the method comprising the steps of:
  (a) accessing the sound source download server and downloading the sound source by using the mobile communication processing unit;
  (b) determining whether or not to designate the sound source as a ringback tone substitute sound source;
  (c) confirming if the sound source can be played as the ringback tone substitute when the sound source is designated as the ringback tone substitute sound source;
  (d) converting the sound source into the ringback tone substitute sound source by using the sound source conversion unit when the sound source cannot be played as the ringback tone substitute; and
  (e) designating the sound source as the ringback tone substitute sound source.

30. The method as claimed in claim 29, further comprising a step of (b1) authenticating a right to use the sound source after step (b).

31. The method as claimed in claim 29, further comprising a step of (f) adding a flag to the sound source so as to indicate that the sound source is the ringback tone substitute sound source after step (e).

32. The method as claimed in claim 29, further comprising, after step (e), the steps of:
  (g) originating a call to the mobile communication network by using the mobile communication processing unit and playing data received from the mobile communication processing unit by using the voice codec unit;
  (h) confirming if the ringback tone substitute sound is found in the memory when a ringback tone start message informative of beginning of a ringback tone section is received from the mobile communication network;
  (i) selecting the ringback tone substitute sound source and playing the ringback tone substitute sound source by using the audio codec when it is confirmed in step (h) that the ringback tone substitute sound source has been found; and
  (j) playing data received from the mobile communication processing unit by using the voice codec unit when a ringback tone termination message informative of ending of the ringback tone section is received from the mobile communication network.

* * * * *